United States Patent [19]

Mickus et al.

[11] Patent Number: 4,743,289

[45] Date of Patent: May 10, 1988

[54] LIGNOSULFONATE AS GRANULATION AID-PARTICLE HARDENER

[75] Inventors: J. C. Mickus, Bloomington, Minn.; Cecil P. Harrison, Florence; Cullen G. Tittle, Tuscumbia, both of Ala.

[73] Assignee: Tennessee Valley Authority, Muscle Shoals, Ala.

[21] Appl. No.: 83,332

[22] Filed: Aug. 10, 1987

[51] Int. Cl.$^4$ .................................. C05D 9/00
[52] U.S. Cl. ............................ 71/61; 71/63; 71/64.05; 71/64.13; 423/162
[58] Field of Search .............. 71/60, 61, 64.05, 64.07, 71/63; 423/162, 237, 238, 742

[56] References Cited

U.S. PATENT DOCUMENTS 4,058,389 11/1977 Piccolo et al. .................. 71/60 X
4,589,904 5/1986 Harrison et al. ............... 71/64.05

FOREIGN PATENT DOCUMENTS 0049468 5/1974 Australia .......................... 71/64.05

Primary Examiner—Ferris H. Lander
Attorney, Agent, or Firm—Robert A. Petrusek

[57] ABSTRACT

An improved process for more economically and effectively producing crystalline by-product ammonium sulfate (A/S) by granulating crystalline by-product A/S feedstock and recycle material together with an A/S-sulfuric acid-granulation aid-particle hardener solution and ammonia to bind the crystals together. Underlying the gist of the improvement concept is the identification of a low-cost readily available lignosulfonate by-product of the pulp and paper industry which, when used in predetermined and relatively small proportions, has now been discovered to be very satisfactory as a granulation aid-particle hardener for granulating such by-product ammonium sulfate crystals. Use of lignosulfonate instead of alum, as is currently practiced, reduces the manufacturing cost of granulating by-product ammonium sulfate by about as much as one dollar per short ton of product.

13 Claims, 1 Drawing Sheet

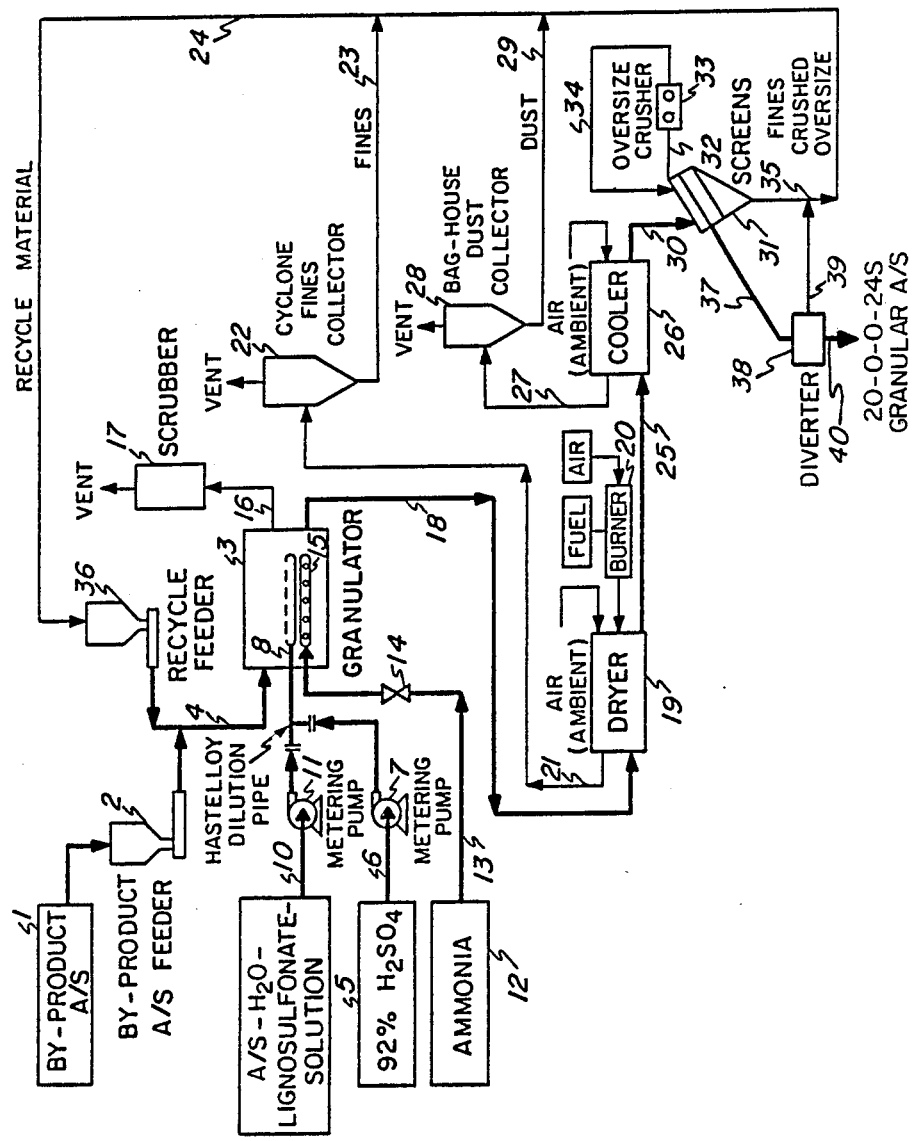

LIGNOSULFONATE AS GRANULATION AID-PARTICLE HARDENER

INTRODUCTION

The present invention reflects on an important improvement on our earlier work which earlier work in turn related to a new process for granulating crystalline by-product ammonium sulfate, i.e., $(NH_4)_2SO_4$, and to the product resulting therefrom. For the sake of convenience and brevity, said ammonium sulfate hereinafter is referred to simply as A/S; more particularly, the present invention relates to an improvement in the production of granular A/S fertilizer which fertilizer has excellent handling properties along with substantially improved granule (particle) sizing and hardness and which properties in such products very desirable either for direct application to soil environments or for blending with other granular fertilizer materials; and still more particularly, the present invention relates to an improvement on our earlier disclosed and patented novel method for granulating fine by-product crystalline A/S with the utilization therein of only relatively small proportions of sulfuric acid and ammonia. All feedstock, A/S crystals and concentrated acid are fed directly to the granulation bed, thereby, the highly corrosive problems heretofore normally associated with the use of dilute sulfuric acid and with the manufacture of A/S are minimized. More particularly, the instant improvement on our earlier work relates to an improved process wherein a low-cost papermill by-product material is used in quantities ranging from about 0.2 to 1.0 percent by weight of the final A/S product to promote granulation of the resulting by-product A/S crystals and also act as an A/S granule hardening agent. Our newly discovered granulation aid-hardening agent is fed as solution together with other solution feed to the granulator device. We have found that the use of the new granulation aid-hardening agent of the instant invention reduces the manufacturing cost of granulation of by-product A/S by about one dollar per ton of product.

BACKGROUND OF THE INVENTION

1. Field of the Invention

As is well known, both nitrogen and sulfur are only two of a plethora of chemical elements that are essential to proper nutrition of living plants. The plant nutrients, nitrogen and sulfur, are commonly classified by agronomists as primary and secondary, respectively, Both of these nutrients, of course, are required for most important farm crops, for example, cereals and fibers.

In 1983, the estimated annual production of by-product crystalline A/S in the United States was about 2 million short tons. The chief sources of by-product A/S are from the production of caprolactam, an intermediate in production of nylon, from production of methacrylates, and in the coking of coal. These by-products are commonly recovered as relatively dilute solutions which are subsequently concentrated to cause the A/S to precipitate in, for instance, a crystallizer unit as mainly fine crystals.

The resulting crystalline product is separated from the mother liquor, and its primary use is in the fertilizer industry. The relatively few large crystals are separated from the multiplicity of small crystals by screening and are used mainly as direct-application fertilizer or for blending with other fertilizer materials so there is a homogeneity with respect to particle sizes of the various materials.

The physical state of fine- or standard-size crystalline by-product A/S is suitable for the manufacture of chemically granulated fertilizer commonly referred to as "compound," "complex," or "cogranulated" fertilizers. In the manufacture of these types of fertilizers, all ingredients normally are mixed homogeneously prior to formation of particulate granules, with the result that each granule of the resultant fertilizer mixture contains all ingredients in the predetermined proportion and in a mechanically and/or chemically bonded, nonsegregable union. It is thusly assured that if the resulting fertilizer is applied uniformly to the soil, all ingredients therein will also be applied uniformly.

Most of the crystalline by-product A/S as recovered from the crystallizer operation supra, however, is not in suitable physical state, particularly with respect to particle size, for use in another large and important class of fertilizers generally known as "bulk-blends" or "dry-mixed" fertilizers. Fertilizers of this type consist of simple, dry, mechanial mixtures of discrete, nonbonded granules of two or more chemical compositions. The granules of different composition are blended in proportions calculated to yield a mixture of the desired overall fertilizer nutrient composition. This method of fertilizer preparation, being simple and adaptable to small production operations at or near the locations of fertilizer usage, is extremely popular in the United States. However, to ensure the homogeneity within a given small volume of such dry-blended fertilizers during mixing, handling, and field application, it has been found essential that all the various ingredients be of closely matched particle size distribution (Hoffmeister, George. "Quality Control in a Bulk Blending Plant," Proc. TVA Fertilizer Bulk Blending Conference, Louisville, Ky., Aug. 1-2, 1973). Ignoring this requirement and preparing blends from ingredients of unmatched particle size, inevitably results in segregation of the various components during mixing, handling, and field application. Thus, homogeneity will be lost and the aforementioned undesirable agronomic effect of nonhomogeneous field application will be encountered.

In view of this important requirement that individual ingredients of bulk blends be matched in particle size distribution, crystalline by-product A/S cannot be incorporated properly therein because of its small particle size.

Modern fertilizer application equipment for broadcast or for row placement application of direct-application solid fertilizer is designed for handling free-flowing granular type materials, such as granular or pelleted ammonia nitrate or urea. It absolutely will not properly handle such fine crystalline A/S. When attempts are made to apply nongranular materials such as said crystalline by-product A/S with use of conventional, modern-day application equipment, it has proved impossible to achieve uniform ground coverage becaus of ballistic action, poor flow characteristics, and bridging tendency of fine particle-size materials in the applicator.

2. Description of the Prior Art

In view of the above enumerated considerations, and since the development of the highly successful, technically viable, and economically attractive process for granulating by-product A/S, as described in the teachings of our earlier work, as is now reflected in U.S. Pat. No. 4,589,904, Harrison et al., May 20, 1986, assigned to the assignee of the present invention; substantial efforts have been directed by many practitioners in the fertilizer industry toward lowering production costs of manufacturing such granular A/S from such by-product A/S crystals. Indeed, it is expected that in the near future, industry will commercialize the process chiefly because the popularity of the granular product as an excellent source of nitrogen and water-soluble sulfur for agriculture and because the process will solve a current disposal problem for producers of the by-product A/S crystals. It also should now be obvious to those skilled in the art just how important our earlier and parent invention is to the large class of bulk-blended fertilizers. It also should now be obvious to those skilled in the art just how important the present invention is to the large class of fertilizer manufacturers whom have already recognized the worth and value of our said earlier work taken in view of the presently described work and the substantial reduction on production costs attendant thereto.

SUMMARY OF THE INVENTION

The present invention comprises an improvement on our earlier described method for converting fine crystalline A/S ($NH_4$)$SO_4$ to a large granular form suitable in particle size distribution, hardness, solubility, and other important characteristics for direct application or for addition to bulk-blend fertilizers to produce homogeneous, nonsegregating blends according to the method preferred by blend manufacturers as outlined above. As in the disclosure of our parent work supra the present invention, as will be apparent from a reading of the description infra, details a method by which mixtures comprising from about 70 percent upwards to about 80 percent of crystalline by-product A/S and from about 20 percent to about 30 percent of equivalent A/S as sulfuric acid and ammonia is processed directly to the desired granular form by agglomeration with relatively small proportions of sulfuric-A/S solution or sulfuric acid solution along with ammonia in standard granulation equipment; such as, for example, a conventional TVA rotary-type ammoniator granulator drum, as in U.S. Pat. Nos. 2,729,554, Neilson, Jan. 3, 1956, and 2,741,545, Neilson, Apr. 10, 1956, assigned to the assignee of the present invention. For purposes of teaching, disclosing, and claiming the instant invention, the teachings, disclosures, and claims of said '554 and '545, as well as '904 supra, are herewith and hereby incorporated herein by reference thereto.

Based on the experiences of others who have worked in this and related fields of endeavor, as for example, U.S. Pat. No. 3,464,809, Hicks, Sept. 2, 1969, assigned to the assignee of the present invention, it was logically concluded that a preneutralizer would be necessary for removal of water and to minimize ammonia loss in the granulator; therefore, in our early work, a preneutralizer was therein employed. As work on our parent invention supra, progressed, it was determined that the preneutralizer was, in fact, not needed for the above purposes, and that its use only complicated the corrosion problems usually associated with handling ammonium bisulfate and/or dilute sulfuric acid.

Products made by our parent and instant process in the manner described herein consist of hard, desirably sized, free-flowing granules with good handling and storage properties. The resulting material is eminently suitable for use as direct-application fertilizer or for bulk-blending with other readily available dry-blend fertilizer materials.

OBJECTS OF THE INVENTION

It is therefore a principal object of the present invention to develop an efficient and economical method for utilizing the fertilizer values contained in fine-size crystalline by-product A/S heretofore recovered as by-product from crystallizer operation by converting said fine-size crystalline A/S material to a hard, nonfriable granular material of a size eminently suitable for use as direct-application fertilizers or for use in solid fertilizer bulk-blending operations by our new, novel, relatively simple, and improved process wherein is utilized as feed thereto, along with said fine crystalline A/S, only relatively small proportions of sulfuric acid and ammonia and as a granulation aid-particle hardener, relatively minute amounts of a material selected from the general class of wood constituents generally known as lignosulfonates.

Another object of the present invention is to develop an efficient and economical method for utilizing the fertilizer values contained in fine-size crystalline by-product A/S, heretofore recovered as by-product from crystallizer operation, by converting said fine-size crystalline A/S material to a hard, nonfriable granular material of a size eminently suitable for use as direct-application fertilizers or for use in solid fertilizer bulk-blending operations by our new, novel, relatively simple, and improved process wherein is utilized as feed thereto, along with said fine crystalline A/S, only relatively small proportions of sulfuric acid and ammonia, and as a granulation aid-particle hardener relatively minute amounts of a material selected from the general class of wood constituents, generally known as lignosulfonates, and more particularly to minimize the cost of manufacturing such fertilizer, especially in granulation of finely divided by-product fertilizer materials so as to transform these materials into suitable form for use in the bulk-blending segment of the fertilizer industry.

Still another object as well as more general advantages of the present invention is to identify low-cost readily available materials that, when used in relatively small quantities, function as a granulation promotor for various materials, such as by-product A/S crystals, and also function by some yet unknown mechanism as a crystal modifier that results in increased mechanical stability of granules produced in the instant process, and it should be appreciated that the instant teaching of the use of the novel by-product material (lignosulfonate) comprising the instant invention should not be limited to granulation of by-product A/S alone, but should also be applicable to granulation of other by-product materials or to granulation of a plethora of other materials in which particle hardness and mechanical stability of particles are a desired quality of the final product or where particle hardness and stability affect the degree of dustiness during manufacture and handling of the final product.

Still further and more general objects and advantages of the present invention will appear from the more detailed description set forth in the following disclosure and examples, it being understood, however, that this more detailed description is given by way of illustration and explanation only and not necessarily by way of limitation, since various changes therein may be made by those skilled in the art without departing from the true scope and spirit of the instant invention.

DESCRIPTION OF THE DRAWING

The present invention will be better understood from a consideration of the following description taken in connection with the accompanying drawing in which:

The single FIGURE is a flowsheet of the preferred pilot-scale plant arrangement generally illustrating the principles of our process which result in granular A/S produced chiefly from by-product crystalline material having the satisfactory properties herein required.

Referring now specifically to the FIGURE, by-product, standard-size or fine-size crystalline A/S from source 1 may be introduced by means for control of flow 2 into granulator 3 together with recycle materials, from a later-mentioned described screening operation, by means of line 4 simultaneously along with sulfuric acid (92 percent $H_2SO_4$ preferred) fed from source 5 by means of line 6 and means for control of flow 7 to Hastelloy metal alloy dilution pipe-sparger 8. Simultaneously therewith the lignosulfonate additive comprising the main thrust of the concept underlying the gist of the instant improvement on our earlier disclosed invention, from source 9 is fed by means of line 10 and means for control of flow 11 to Hastelloy dilution pipe-sparger 8. Simultaneously therewith gaseous or liquid anhydrous ammonia from source 12 is fed by means of line 13 and by means for control of flow 14 to stainless steel (type 316 preferred) ammonia sparger 15. The water of dilution, shown at source 9, is normally obtained from the wet-scrubbing system of a commercial ammonium sulfate production plant, and as shown in the preferred embodiment, is introduced into drum 3 through said sparger 8. Such an arrangement tends to to keep the orifices of said acid sparger open and clean. Still another preferred arrangement, although not shown in the FIGURE is to introduce said water into drum 3 through ammonia sparger 15, which arrangement also keeps the orifices thereof clean. If desired, the water stream can be split, and a portion thereof fed to each sparger, i.e., 8 and 15. In another embodiment of the instant invention the lignosulfonate solution and the dilution water may be introduced together with the ammonia to drum 3 by means of ammonia sparger 15. In granulator 3, the wetting action of the acid-water A/S-solution phase fed thereinto together with the chemical reaction of free acid and ammonia therein causes a substantial portion of the dry solids introduced into said granulator 3 to agglomerate into the desired granular form. The resulting granular material discharging via later-mentioned line 18 from granulator 3 contains about 0.5 percent to 1.5 percent moisture as determined by the Karl Fischer method, and displays a crushing strength of the resulting minus 7- plus 8-mesh size granules in the range of about 1 to 2 pounds. During operation, ambient temperature air is caused to flow either cocurrent or countercurrent to flow of solids through granulator 3 and is exhausted by means of line 16 to wet scrubber 17 and subsequently is vented to the atmosphere. Ammonia loss from the granulator operation is in the range of 1.0 percent to 2.0 percent of the total ammonia fed. Subsequently, granular material from granulator 3 flows by means of line 18 to dryer 19. Hot air, together with combustion products from source 20, is directed countercurrent to the flow of solids through dryer 19 to effect additional moisture removal and subsequent hardening of the granules therein. The drying gases from source 20 exit dryer 19 and flow by means of line 21 to cyclone fines collector 22 and are subsequently vented to the atmosphere. The fines collected at cyclone 22 flow by means of line 23 to line 24 which also handles recycle material from a later-mentioned and detailed screening operation. Dried granular material with moisture content (Karl Fischer method) of about 0.1 percent to 0.5 percent moisture from dryer 19 flows by means of line 25 to cooler 26. Ambient temperature air is caused to flow countercurent to the flow of solids through cooler 26 and exits by means of line 27 to bag-house dust collector 28 where the dust is separated from the air. The air is vented to the atmosphere and the dust, by means of line 29 is transported to recycle material line 24. Granular material from cooler 26 flows by means of line 30 to screen deck 31 whereon the material is sized as desired, preferably minus 5- plus 9-mesh Tyler screen size. The oversize material from screen deck 31 flows by means of the line 32 to crusher 33 wherein the oversized is partially crushed; the partially crushed material then flows by means of line 34 back to screen deck 31 for rescreening. The granulator fines and fines from the crushing operation flow from screen deck 31 by means of line 35 to recycle line 24. Product from screen deck 31 flows via line 37 to diverter device 38. The portion of the product which is diverted by device 38 flows via line 39 and joins fines and crushed oversize in line 35 with line 24 which line 24 transports such recycle material, dust, and some product size material to recycle feeder 36. Product to storage is withdrawn via line 40.

DESCRIPTION OF THE PREFERRED EMBODIMENTS

In the present method for converting crystalline A/S to granular form, we have found that a mixture comprising from about 70 weight percent upwards to about 80 weight percent thereof as sulfate, together with sulfuric acid equivalent from about 20 weight percent to about 30 weight percent of the total product A/S, can be easily agglomerated in conventional granulation equipment.

When the proportions of the total sulfate, say 20 percent to 30 percent, are supplied as sulfuric acid, ammonia is added to the granulator to essentially neutralize the acid to a $NH_3:H_3PO_4$ mole ratio of 1.80 to 1.95; no applied heat is required for the granulation operation, the heat of reaction therefrom being sufficient. A stream of air through a conventional rotary drum or other suitable device is required to remove the water added thereto as acid solution. At this point and place in the practice of the invention comprising our parent patent '904 supra, we had taught that a small portion of alum, may, in some circumstances, be utilized beneficially in the process of that invention. In the disclosure of the improvement comprising the instant invention we now teach and claim that materials selected from the class of wood constituents generally know as lignosulfonates be substituted therefor.

The crystalline by-product A/S utilized as feedstock in the process of the instant invention as it relates to our process may be any suitable material, pure or impure, that contains chiefly this compound. Examples of such suitable materials are crystalline by-product A/S from the production of caprolactam, from coal coking, and from production of methacrylates. It is also envisioned that crystalline A/S from operations such as pollution control of fossil fuel stack-gas emissions will be suitable as feedstock for the practice of the instant process as should any other crystalline A/S from other sources.

The particle size, fine size, or standard size, of by-product from the above named sources has been very satisfactory for the process so that grinding to produce fines has therefore been unnecessary. If grinding should prove to be necessary, the crystalline A/S may be milled alone or in combination with oversized and/or undersized product recycled from a later mentioned screening operation in the process.

The preferred liquid binder used in the practice of the present invention is an aqueous solution of sulfuric acid. Industrial-grade sulfuric acid is preferred because of economics and reduced corrosion problems, but certain spent sulfuric acids from other processes may also be utilized if economics dictate. The preferred concentration of spent sulfuric acid used in the present granulation process is 30 percent to 60 percent with the most preferred concentration being about 45 percent.

According to the teachings of the instant invention in one embodiment thereof the requisite predetermined amounts of lignosulfonate may be incorporated into said improved instant process by combining same in the water A/S-acid dilution solution. The solutions, 92 percent sulfuric and water A/S-lignosulfonate, at ambient or at elevated temperature are metered and transported by means of ordinary type 316 stainless steel pipe to a Type B Hastelloy dilution-sparger pipe located at the granulator so as to minimize the corrosion problems encountered with dilute sulfuric acid. If the granulation process is carried out juxtaposed the location wherein by-product A/S is produced, the A/S saturated acid solution would be prepared by adding the 92 percent acid and water to the already available saturated crystallizer solution. The proportion of the prefered sulfuric-A/S solution should, for best results be about 35 percent by weight of the total feedstock. When the final product contains about 80 percent of by-product A/S and about 20 percent new A/S, about 4 percent of the by-product may be introduced with the acid solution and the remainder is fed as dry material. In our earlier work, we had indications that small amounts, i.e., 4 percent to 15 percent, for example, of the solid A/S by-product should be so diverted to be incorporated in said acid solution. Our later work indicates that this is not critical to the operation of our process; however, it is still a desirable practice in that such incorporation therein effectively increases the ratio of by-product crystalline material: A/S formed by the reaction of acid and ammonia fed to the process. The acid content of the solution binder is reacted with gaseous anhydrous ammonia fed through a drilled pipe sparger located beneath the surface of the granulation bed. The ammonia feed is adjusted to effect a product pH in the preferred range of about 2.0 to 2.5. For an understanding of the significance of the such adjustments see, for example, U.S. Pat. No. 3,351,455, Burns, Nov. 7, 1967.

Contacting of the A/S-acid solution binder with the crystalline by-product A/S feed material and ammonia may be effected in any suitable manner deemed desirable to achieve granulation. For example, the properly sized solid by-product feedstock, together with recycle material, can be fed to a conventional rotary drum-ammoniator-granulator or to a number of other suitable granulating devices, and the A/S-acid solution can be sprayed or streamed simultaneously onto the feedstock soon after it enters the granulator. The preferred method for introducing the A/S-acid solution is to sparge it beneath the granulation bed. This procedure eliminates any acid mist that may occur by the above mentioned procedures. Gaseous anhydrous ammonia is introduced beneath the bed of material maintained in the granulation device and downstream from the entrance point of the solution binder thereinto. By proper adjustment of process variables including raw material feed rates, mainly of recycle and/or dry by-product A/S, and acid solution, granulator rotation speed and slope, retention time, placement of liquid binder, and other pertinent variables, a granular product containing a high proportion of granules of the desired particle size can be discharged from the granulating device. Granules thus discharged immediately exhibit moderate hardness and mechanical stability, due, apparently, to the bonding action of the chemical reaction of the acid-A/S solution and ammonia according the following equations:

$$NH_4HSO_4 + NH_3 \rightarrow (NH_4)_2SO_4$$

$$H_2SO_4 + 2NH_3 \rightarrow (NH_4)_2SO_4$$

In pilot-scale continuous-granulation plant, the moisture content of granular material discharged from the granulator is in the range of about 0.5 percent to 1.6 percent by weight; therefore, drying may simply be accomplished, for example, by passing the material through a conventional, rotary-type dryer equipped with lifting flights. Heat to the dryer may be supplied by any manner of means; such as, for example, air heated with a propane burner. Hot air, together with the combustion products, preferably flow countercurrent to the flow of solids in the dryer and are temperature controlled so that the temperature of the discharging solids is maintained in the range of about 240° F. to about 300° F.

Screening may be done in any manner convenient including the usual method employing stacked vibrating screens. A typical screen stack to be employed for production of granules that will match the size of most granular fertilizers consists of 5-mesh and 9-mesh screens (Tyler screen series). Oversize material, meaning that not passing the 5-mesh screen, may be pulverized and recycled to the granulator along with the crystalline by-product A/S feed. Undersized, meaning that passing the 9-mesh screen, may be recycled either with or without pulverization thereof.

EXAMPLES

In order that those skilled in the art may better understand how the present invention can be practiced, the following examples are given by way of illustration and not necessarily by way of limitation. It is noted that the first instant example infra, i.e., Example I is offered as an extrapolated parallel to Example I found in our parent patent '904 supra and is the result of data and information we have developed in our subsequent thereto and reflected in our disclosure of our instant improvement thereover, it being understood that our work on the instant improvement has as yet only progressed to the bench-scale size of equipment as is reflected in Examples II to VI infra, rather than the pilot-scale size of equipment as as the case relating to work performed on and in said parent invention.

EXAMPLE I

A very satisfactory product containing 20.3 to 20.5 weight percent nitrogen (all percents are given in this and the following examples by weight percent unless otherwise indicated), 24 percent sulfur, and 0.23 percent moisture is granulated continuously in a pilot-scale operation of 4.5 hours run time at a production rate of 1000 pounds per hour from a feed comprising 70 percent commercial standard size (run-of-pile) by-product A/S and 30 percent A/S made from sulfuric acid and gaseous anhydrous ammonia. About 96 percent of the by-product feedstock supra is fed to the process as dry feedstock and the remainder, about 4 percent, it dissolved in water of dilution into which has already been added either calcium or ammonium lignosulfonate, said water of dilution to be later admixed with the sulfuric acid utilized in this process to make said 30 percent fraction feed produced by reacting said sulfuric acid and gaseous ammonia to produce A/S solution and introduced to the process therein incorporated. As noted, the acid solution contained a small quantity of lignosulfonate as granulation aid, i.e., from about 1.0 to about 0.1 percent by weight based on the A/S product of either calcium lignosulfonate, ammonium lignosulfonate, or in some instances a mixture thereof. The dry by-product A/S feedstock is fed to the recycle transport system by means of a belt-type feeder. Mixing of by-product and A/S recycle materials occurs during transport to the granulator. The granulator is a rotary drum 3 feet in diameter by 6 feet long and is inclined with a slope of about 0.58 inches per foot from the feed end to the discharge end. The granulator is fitted with a 9½-inch higher retainer ring at the feed end and with a 9-inch high retainer ring that is positioned 4 feet down stream from the feed end of the drum so that the active area of the drum is 4 feet in length. The granulator is equipped with an ammonia sparger, a ⅜-inch-diameter stainless steel tube about 2.5 feet long that contained four ¼-inch diameter openings spaced 6 inches apart. The sparger is positioned beneath the surface of the rolling granulation bed and near its center with respect to its depth so that the sparger openings are directed upstream into the flow of solids. The solution phase, 92 percent sulfuric acid and water A/S-lignosulfonate solution is introduced to the granulator by means of a sparger located beneath the surface of the granulation bed. The solution sparger is a ½-inch closed end Hastelloy (type B) pipe about 2.5 feet long that contains six ⅛-inch openings that are spaced on 4-inch centers. Both the solution and ammonia spargers are welded to a ½-inch rod in a manner so that the solution sparger openings faced upward and 90 degrees from the ammonia sparger openings. The solution sparger is downstream, in regard to passage of solids, from the ammonia sparger. A solution of acid, A/S, and water is metered to the sparger by means of metering pumps; ammonia is metered by means of a rotameter. Residence time in the granulator is about 5 minutes.

The dryer is a rotary drum 3 feet in diameter by 24 feet long. The drum is equipped with lifting flights. Retainer rings at the feed and discharge ends are 8 inches and 5 inches high, respectively. The unit is insulated with a 2-inch-thick layer of magnesia. The unit is hooded at both feed and discharge ends. The drum is rotated at 6 revolutions per minute. The dryer is equipped so that airflow through the unit is countercurrent. Propane is used as the heat source for drying. The preferred drying arrangement for the process as shown, for example, in the FIGURE, is countercurrent flow of air to flow of solids. The discharge end hood door is opened and the propane burner tip is located about 18 inches from the dryer discharge end and the flame is controlled so that the temperature of the granular discharge product is about 270° F. to 300° F. Countercurrent airflow through the dryer at about ambient temperatures (70° F. to 80° F.) is at a rate of about 1740 ft3/min; exit air temperature range from about 120° F. to 155° F. The heat requirement is about 0.9 million Btu's per ton of product. Residence time in the dryer is about 15 minutes.

The cooler is a rotary drum 2½ feet in diameter by 20 feet in length and is equipped with lifting flights. The retainers at the feed and discharge ends are 4½ inches and 3¼ inches high, respectively. The unit is rotated at 11 revolutions per minute. In operation, an induced blower is used to cause a stream of ambient air to flow countercurrent to the flow of solids through the unit. Residence time in the unit is about 12 minutes.

A double deck vibrating screen with 12 square feet of active area is used to size the cooler product. Screen (Tyler mesh) sizes are 5 mesh (top) and 9 mesh (bottom). A chain mill, operated at about 1650 revolutions per minute, is used to crush oversize material. The crushed material is returned to the screen deck for re-screening. Fines, from granulation and from crushing, together with some onsize material are returned as recycle.

In the startup operation, the system is loaded with recycle material from a previous operation. The plant equipment is put into operation. Then, the feedstock (A/S-acid solution, ammonia, and by-product crystals) are started. The duration of a test is usually about 5 to 6 hours. At the end of each granulation test the pilot plant is shut down and left loaded with material for the next startup.

Granulation during the pilot-plant run is very good; onsize (minus 5- plus 9-mesh) product is 51 percent and granule (minus 7- plus 8- mesh size) crushing strength is about 2 pounds before drying. Temperature of the granulator product is about 200° F. The recycle to product weight ratio is 4:1. Moisture content of the granulator product is 0.7 percent by the Karl Fischer method and 1.1 by the AOAC method at 130° C. Ammonia loss is 1.7 percent which, of course, could be avoided by scrubbing the exhaust gases with incoming acid in a plant of commercial size.

After drying, the product temperature is 290° F. and moisture is 0.2 percent and 0.4 percent by the Karl Fischer and AOAC method, respectively. Granule (minus 7- plus 8-mesh size) crushing strength is 5 pounds, which is considered in the industry to be excellent; 3.0 pounds is considered to be acceptable.

The temperature of the cooler discharge product is 245° F.; the screening and crushing operation is good. This high discharge temperature is due only to the inefficiency of this particular cooler and is not a condition necessary for good operation. A temperature of about 150° F. is preferred. About 57 percent of the cooler product is on size (minus 5- plus 9-mesh); granule (minus 7- plus 8-mesh size) crushing strength is 5 pounds and moisture content is 0.2 percent to 0.3 percent by the Karl Fischer and AOAC at 130° C. method, respectively.

Chemical analysis of the product (as weight percent) is 20.3 percent nitrogen, 72.3 percent $SO_4$, and 0.04 percent aluminum; the $NH_3SO_4$ mole ratio is 1.93. The product has good appearance and has exhibited excellent handling and storage properties; density, loose-pour, is about 56 pounds per cubic feet and angle of repose is about 38 degrees.

EXAMPLE II

A very satisfactory product containing 20.6 weight percent nitrogen (all percents are given in this and the following examples by weight percent unless other indicated), 24.0 percent sulfur, and 0.1 percent moisture are granulated continuously according to procedure following the thrust of that detailed in Example I supra except that in this and subsequently described tests and examples, the results are not extrapolated and the size of the equipment utilized therefor was bench-scale. In this series of tests the bench-scale operation was for 5 hours runtime at a production rate of 20 pounds per hour from a feed comprising 75 percent of commercial standard-size (run-of-pile) by-product A/S crystals from a caprolactam operation and 25 percent A/S made from sulfuric acid and gaseous anhydrous ammonia. Calcium lignosulfonate as granulation aid-particle hardener in proportions equivalent to 0.42 percent of the final granular A/S product was added to the water of dilution and fed to the process together with the sulfuric acid.

Granulation during the bench-scle run was very good; onsize (minus 5- plus 10-mesh) product after drying was 48.8 percent, moisture content of the product was 0.1 percent, and granule crushing strength (minus 7- plus 8-mesh Tyler size) was 3.5 pounds. Particle (minus 7- plus 8-mesh Tyler size) crushing strength of 3 pounds is considered to be acceptable by the industry. The product, 20 percent nitrogen and 24 percent sulfur, had good appearance and exhibited very good handling and storage properties.

EXAMPLE III

Very satisfactory granular A/S product was made in the same manner as described in Example II supra; except the proportion of calcium lignosulfonate was 0.21 percent of the final product. Duration of the test was 5 hours and 46.6 percent of the dryer product was onsize (minus 5- plus 10-mesh). Moisture content of the product was 0.1 percent and particle (minus 7- plus 8-size) crushing strength was 3.6 pounds. The product, 20 percent nitrogen and 24 percent sulfur, had good appearance and exhibited very good handling and storage properties.

EXAMPLE IV

Very satisfactory granular A/S product was made in the same manner as described in Example II supra; except the lignosulfonate was in the form of ammonium lignosulfonate and the proportion was that for 0.9 percent of the final granular A/S product. Duration of the test was 5 hours and 62.1 percent of the dryer discharge was onsize (minus 5- plus 10-mesh) granules. Moisture content of the product was about 0.1 percent and particle (minus 7- plus 8-size) crushing strength was 3.7 pounds.

Nutrient grade of the product was 20 percent nitrogen and 24 percent sulfur. The product had good appearance and exhibited good handling and storage properties.

EXAMPLE V

Very satisfactory granular A/S product was made in the same manner as described in Example II supra; except the lignosulfonate was ammonium lignosulfonate instead of calcium lignosulfonate and the proportion used was equivalent to 0.45 percent of the final product. Duration of the test was 5 hours and 50.2 percent of the dryer discharge was onsize (minus 5- plus 10-mesh) granules. Moisture content of the product was about 0.1 percent and particle (minus 7- plus 8-size) crushing strength was 3.5 pounds. The product had good appearance and exhibited good handling and storage properties. Nutrient grade of the product was 20 percent nitrogen and 24 percent sulfur.

EXAMPLE VI

Negative example—no additive. In development of the '904 process supra, for granulating by-product A/S crystals, it was learned that without granulation aid, by-product crystals are difficult to granulate or agglomerate and that the particles (granules) formed did not possess the required mechanical stability to retain form during further processing such as drying, crushing, screening, and handling. Without granulation aid-particle hardener, the process was not successfully carried out continuously because the quantity of fines generated continued to increase and all could not be returned as recycle to the process.

INVENTION PARAMETERS

After sifting and winnowing through the data herein presented as well as other results and operations of our novel process for producing granular A/S chiefly from by-product A/S which product granular A/S is eminently suitable for direct application to the soil or for use in the bulk blending segment of the fertilizer industry, the operation variables and preferred conditions for carrying out our process are summarized below:

| OPERATING CONDITIONS | | |
|---|---|---|
| Variables | Limits | Preferred |
| By-product ammonium sulfate[a] feed to granulator Particle size % passing 20 mesh Tyler screen | 30–100 | 40–95 |
| Solution feed to dilution sparger Sulfuric acid[b] concentration, wt % | 30–98 | 90–92 |
| Solution for acid dilution A/S-Water solution, lb. A/S/lb. H$_2$O | 0–0.4 | 0.1–0.2 |
| Acid-Water-A/S solution for granulation, wt % H$_2$SO$_4$ | 30–60 | 40–55 |
| Granulation discharge | | |
| Temperature, °F. | 100–212 | 150–200 |
| Moisture (Karl Fischer) content of material, wt % | 0.2–3.0 | 0.1–2.5 |
| Mole ratio, NH$_3$:SO$_4$ | 1.80–2.00 | 1.85–1.98 |
| pH (10% by weight in H$_2$O) | 1.80–2.60 | 2.20–2.50 |
| Dryer discharge | | |
| Temperature, °F. | 250–325 | 270–300 |
| Moisture (Karl Fischer) content of material, wt. % | 0.1–1.0 | 0.2–0.5 |
| Recycle material Temperature, °F. | 70–250 | 100–200 |
| Lignosulfonate Granulation Aid | | |
| Calcium Lignosulfonate | 1.0–0.1 | 0.4–0.2 |
| Ammonium Lignosulfonate | 1.0–0.1 | 0.5–0.2 |

[a]Crystalline by-product ammonium sulfate from production of caprolactam, methacrylates, coking coal, fossil fuel stack scrubbing, or any similar process.
[b]Industrial grade sulfuric acid, 92% H$_2$SO$_4$.

While we have shown and described particle embodiments of our invention, modifications and variations thereof will occur to those skilled in the art. We wish it to be understood, therefore, that the appended claims are intended to cover such modifications and variations which are within the true scope and spirit of our invention.

What we claim as new and desired to secure by Letters Patent of the United States is:

1. An improved process for utilizing both by-product crystalline A/S and a new and novel granulation aid-particle hardener to substantially effect the economical attributes of the production of high-purity granular A/S product of predetermined, closely controlled particle size eminently suitable for either subsequent direct application to soil systems, or for utilization in fertilizer bulk blending operations comprising the steps of:

(a) maintaining in an inclined rotating rotary ammoniator-granulator-type drum a rolling bed of discrete particles therein of crystalline by-product A/S and recycle material, with recycle material introduced therein from step (e) infra;

(b) continuously introducing into the upper end of said inclined rotating drum a stream of crystalline by-product A/S and recycle material;

(c) continously introducing into said inclined rotating drum separate streams of sulfuric acid-A/S solution and ammonia beneath the surface and near the center of the rolling granulation bed, with respect to its depth, the relative proportion of said sulfuric acid and said ammonia introduced into said rotating drum granulator being maintained so as to yield a mole ratio of $NH_3SO_4$ in said granulator A/S product ultimately removed therefrom in the range from about 1.80 to about 1.95;

(d) continuously introducing into the upper end of said inclined rotating drum fines and crushed oversize ammonium sulfate product recycled thereto from a later-mentioned sizing step;

(e) admixing said by-product crystalline A/S and said recycle material with sulfuric acid-A/S solution and ammonia in predetermined portions and for a time sufficient so as to effect agglomeration by both the chemical reaction and rolling action imparted by the rotating drum to said mixture of dry crystalline by-product A/S and recycle material;

(f) maintaining the materials introduced into said inclined rotating drum at a temperature and for a time sufficient to effect therein the agglomeration of granules of crystalline ammonium sulfate of size sufficient to range from between about 40 percent to about 90 percent minus 5- plus 9-mesh Tyler screen series.

(g) continuously discharging at least a portion of the granular material resulting from step (f) supra from the lower end of said inclined rotating drum and introducing same into drying means;

(h) maintaining the material introduced into said drying means at a temperature and for a time sufficient therein to reduce the moisture content thereof to the range of from about 0.1 percent to about 1.5 percent by weight and subsequently introducing same into cooling means;

(i) contacting the material in said cooling means with countercurrent flow of ambient temperature air for a time sufficient therein to reduce temperature of the A/S material therein to the range of from about 200° F. to about 260° F.; and (j) subsequently removing the resulting cooled material from said cooling means in step (i) supra, and introducing into sizing means wherefrom product A/S granules ranging from about minus 5- to plus 9-mesh Tyler are recovered and withdrawn to storage and wherefrom undersize and crushed oversize are recycled to said feed-end of said inclined rotating granulation drum; the improvement in combination therewith for enhancing the physical characteristics of the resulting A/S product, which improvement comprises the addition to said drums of a stream of predetermined amounts of granulation aid-particle hardener material selected from the class of wood constituents known as lignosulfonates.

2. The process of claim 1 wherein a stream of said lignosulfonate is combined with said sulfuric acid solution stream in step (c) thereof for introduction into said drum.

3. The process of claim 1 wherein a stream of said lignosulfonate is combined with said ammonia stream in step (c) thereof for introduction into said drum.

4. The process of claim 1 wherein said sulfuric acid-A/S solution has an initial concentraton in the range from about 40 percent to about 60 percent by weight $H_2SO_4$.

5. The process of claim 2 wherein the concentration of sulfuric acid ranges from about 35 percent to about 55 percent by weight $H_2SO_4$.

6. The process of claim 2 wherein the quantity of said sulfuric acid-A/S solution introduced into the upper end of said inclined rotating drum is utilized in proportions such that it ranges from about 12 percent to about 30 percent by weight, on an A/S basis, of the total A/S introduced into said inclined rotating drum.

7. The process of claim 2 wherein the temperature in said inclined rotating drum is maintained in the preferred range of about 150° F. to about 200° F.

8. The process of claim 1 wherein the handling of dilute sulfuric acid and/or ammonium sulfate occurs substantially at granulator dilution sparger; said process characterized by the fact that it may therefore be utilized in current day existing fertilizer granulation plants with substantially no changes required of the mechanical requirements therein.

9. The process of claim 1, 2, 3, 4, 5, 6, 7, or 8 wherein said granulation aid-particle hardener is calcium lignosulfonate and is added thereto in amounts ranging from about 1 to 0.1 percent by weight based on the weight of said A/S product.

10. The process of claim 1, 2, 3, 4, 5, 6, 7, or 8 wherein said granulation aid-particle hardener is calcium lignosulfonate and is added thereto in amounts ranging from about 0.4 to about 0.2 percent by weight based on the weight of said A/S product.

11. The process of claim 1, 2, 3, 4, 5, 6, 7, or 8 wherein said granulation aid-particle hardener is ammonium lignosulfonate and is added thereto in amounts ranging from about 1 to about 0.1 percent by weight based on the weight of said A/S product.

12. The process of claim 1, 2, 3, 4, 5, 6, 7, or 8 wherein said granulation aid-particle hardener is ammonium lignosulfonate and is added thereto in amounts ranging from about 0.5 to about 0.2 percent by weight based on the weight of said A/S product.

13. The process of claim 1, 2, 3, 4, 5, 6, 7, or 8 wherein said granulation aid-particle hardener is selected from the group of lignosulfonates comprising calcium lignosulfonate, ammonium lignosulfonate, or mixtures thereof in amounts ranging from about 1.0 to about 0.1 percent based on the weight of said A/S product.

* * * * *

UNITED STATES PATENT AND TRADEMARK OFFICE
CERTIFICATE OF CORRECTION

PATENT NO. : 4,743,289

DATED : May 10, 1988

INVENTOR(S) : J. C. Mickus, Cecil P. Harrison, and Cullen G. Tittle

It is certified that error appears in the above-identified patent and that said Letters Patent are hereby corrected as shown below:

Column 1, line 1, before the heading "Introduction," the following sentence should be inserted —

The invention herein described may be manufactured and used by or for the Government for governmental purposes without the payment to us of any royalty therefor. —

Column 1, line 17, after "products" and before "very" insert — are —

Column 1, line 50, after "respectively," delete — , — and insert — . —

Column 2, line 58, "becaus" should be — because —

Column 3, line 24, "(NH4)SO4" should be — $(NH_4)_2SO_4$ —

Column 5, line 33, "tends to to keep" should be — tends to keep —

Column 6, line 17, after "by means" and before "line 32" delete — the —

Column 8, line 62, "equipment as as" should be — equipment as was —

Column 9, line 9, "it" should be — is —

Column 9, line 29, "higher" should be — high —

Column 10, line 64, "NH3SO4" should be — $NH_3:SO_4$ —

Column 13, line 14, "with" should be — said —

Column 13, line 26, "NH3SO4" should be — $NH_3:SO_4$ —

Column 13, line 26, "granulator" should be — granular —

Signed and Sealed this

Sixth Day of December, 1988

Attest:

DONALD J. QUIGG

Attesting Officer      Commissioner of Patents and Trademarks